United States Patent
Somech et al.

(10) Patent No.: US 12,455,698 B2
(45) Date of Patent: Oct. 28, 2025

(54) SYSTEM AND METHOD FOR INDEXING A DATA ITEM IN A DATA STORAGE SYSTEM

(71) Applicant: HUAWEI TECHNOLOGIES CO., LTD., Shenzhen (CN)

(72) Inventors: Ovad Somech, Hod Hasharon (IL); Assaf Natanzon, Hod Hasharon (IL); Idan Zach, Hod Hasharon (IL); Aviv Kuvent, Hod Hasharon (IL); Yair Toaff, Hod Hasharon (IL); Elizabeth Firman, Hod Hasharon (IL); David Spinadel, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/461,261

(22) Filed: Sep. 5, 2023

(65) Prior Publication Data
US 2023/0409222 A1 Dec. 21, 2023

Related U.S. Application Data

(63) Continuation of application No. PCT/EP2021/061371, filed on Apr. 30, 2021.

(51) Int. Cl.
*G06F 3/06* (2006.01)

(52) U.S. Cl.
CPC ............ *G06F 3/064* (2013.01); *G06F 3/0626* (2013.01); *G06F 3/0671* (2013.01)

(58) Field of Classification Search
CPC ...... G06F 3/064; G06F 3/0626; G06F 3/0671; G06F 16/9017
See application file for complete search history.

(56) References Cited

U.S. PATENT DOCUMENTS

| | | |
|---|---|---|
| 10,938,961 B1 | 3/2021 | Ponnala et al. |
| 2002/0073276 A1* | 6/2002 | Howard ............. G06F 11/1471 711/216 |
| 2013/0046949 A1* | 2/2013 | Colgrove ............... G06F 3/064 711/170 |
| 2021/0191911 A1* | 6/2021 | Ponnala ............. H04L 9/0643 |
| 2021/0357147 A1* | 11/2021 | Li ........................... G06F 21/16 |
| 2022/0236904 A1* | 7/2022 | Miller ................... G06F 3/0652 |

FOREIGN PATENT DOCUMENTS

| | | | | |
|---|---|---|---|---|
| CN | 104618361 A | * | 5/2015 | ......... G06F 16/2255 |
| EP | 1307833 A2 | | 5/2003 | |
| WO | 03012695 A2 | | 2/2003 | |

* cited by examiner

*Primary Examiner* — Hosain T Alam
*Assistant Examiner* — Subir Kumar Chowdhury
(74) *Attorney, Agent, or Firm* — Leydig, Voit & Mayer, Ltd.

(57) ABSTRACT

A computer-implemented method for indexing a data item in a data storage system includes: dividing the data item into one or more large blocks; dividing each large block into one or more small blocks; calculating a strong hash value for each of the small blocks and storing a list of strong hash values with a pointer to a location of the large block; from the list of strong hash values calculated for each large block, selecting one or more representative hash values for the large block; and compiling a sparse index including an entry for each large block. Each entry is based on the representative hash values and a pointer to the list of strong hash values for each large block.

20 Claims, 11 Drawing Sheets

SYSTEM AND METHOD FOR INDEXING A DATA ITEM IN A DATA STORAGE SYSTEM

CROSS-REFERENCE TO RELATED APPLICATIONS

This application is a continuation of International Application No. PCT/EP2021/061371, filed on Apr. 30, 2021, the disclosure of which is hereby incorporated by reference in its entirety.

TECHNICAL FIELD

The disclosure relates to a computer-implemented method for indexing a data item in data storage systems, and more particularly, the disclosure relates to a data indexing module for a data storage system for indexing a data item. Moreover, the disclosure also relates to a data storage system including one or more data storage units, and the data indexing module for indexing a data item in the data storage system.

BACKGROUND

Dynamic data similarity detection is a method to recognize a similarity among dynamic data entities (i.e. files, data blocks, etc.). This method can be used in network systems, storage systems in which the storage and network consumption can be reduced by storing or transmitting only one copy of duplicated data entity while referencing a selected copy of the data entity at repetitions of the same content. A known solution implements a similarity recognition system for detecting similarities among dynamic data entities. However, the main challenge in implementing the known similarity recognition system is the efficient handling of random metadata updates. This requirement is extremely challenging when handling large amounts of data. Due to a large amount of metadata required, the metadata was not stored in fast accessed memory such as random access memory (RAM), instead, was kept in a lower performance media such as spinning disk, solid-state drive (SSD), etc. Even at scenarios in which the metadata updates are at a size that enables efficient media access, (i.e. simpler one input and output, IO, to overwrite existing metadata), due to the nature of the metadata size, which is much smaller than the data size, random writes may require updates of small scattered portions of the metadata. This, in turn, may lead a storage controller to read a larger portion of the existing metadata, merge the new update into the existing metadata, and perform write to the newly merged metadata back to the metadata. This behaviour may reduce the performance of the known similarity recognition system by a factor of 3 due to the need to perform three random IO in order to serve one user IO.

Several existing approaches are employed to maintain the metadata and increase the efficiency of access to low-performing media while looking for data duplications. In a known approach, a prediction filter (e.g. bloom filter) is used to predict the probability of media access that results in a successful similarity detection. Due to this, the performance desegregation as a result of unsuccessful attempts to search for metadata is significantly reduced and the performance is significantly increased.

Another known approach employs a method that uses a layered layer of indexing in which metadata is gathered for larger chunks of data. The similarity detection for larger chunks of data enables the benefits of small metadata footprint for keeping the higher layer of an index and the efficient access to metadata and the data once the data and metadata is grouped according to time and/or location reference. The layered layer of indexing fails to remove the need to update the metadata at overwriting scenarios. Also, the known approach fails to reduce the performance impact in such scenarios. Further, this method enables the similarity detection system to anticipate expected data and metadata by context, perform read ahead of both, efficiently utilize storage read and write caches, and minimize expensive storage physical lookup, as cylinder change in spinning disks.

Further, the prediction filter is used to increase the efficiency of access to low-performing media. However, the use of the prediction filter has the following disadvantage as the prediction filter does not eliminate the need to update the metadata at overwriting scenarios, and therefore it does not reduce the performance impact in those scenarios. Further, the prediction filter does not have means of efficient removal of referenced content which usually creates the need to zero the prediction filter once in a period of time. In a hotspot scenario where a given data segment is repeatedly being overwritten, the efficiency of the prediction filter is dropped sharply. Further, using the prediction filter only increases the probability for a successful single similarity lookup but it does provide the ability to anticipate the expected data and the metadata, to perform read ahead of both, and to efficiently utilize read and write caches.

Similarly, the use of similarity detection for big chunks of data, in order to increase the efficiency of access to low performing media, is challenging as it does not remove the need to update the metadata at overwriting scenarios, and therefore it cannot be used to reduce the performance impact in those scenarios.

Therefore, there arises a need to address the aforementioned technical drawbacks in known techniques or technologies in indexing the data item.

SUMMARY

Exemplary embodiments of the disclosure provide a computer-implemented method for indexing a data item in a data storage system, a data indexing module for a data storage system for indexing a data item, and a data storage system including one or more data storage units, and the data indexing module for indexing a data item while avoiding one or more disadvantages of prior art approaches.

The disclosure provides a computer-implemented method for indexing a data item in a data storage system, a data indexing module for the data storage system, and the data storage system including the data indexing module for indexing the data item in the data storage system.

According to a first aspect, there is provided a computer-implemented method for indexing a data item in a data storage system. The method includes dividing the data item into one or more large blocks. The method includes dividing each large block into a plurality of small blocks. The method includes calculating a strong hash value for each of the small blocks and storing a list of strong hash values with a pointer to a location of the large block. The method includes selecting one or more representative hash values for the large block from the list of strong hash values calculated for each large block. The method includes compiling a sparse index comprising an entry for each large block. Each entry is based on the representative hash values and a pointer to the list of strong hash values for each large block.

The computer-implemented method generates a sparse index for the data storage system without changing underlying data. If the data storage system supports an xcopy function, the deduplication of the data item is applied without changing the data format of the underlying data. In addition, the deduplication can be applied while maintaining high system performance, because after checking the sparse index, the relevant metadata can be reached with a single input-output (IO) operation, thereby reducing disc access time/operations and network traffic (for a network drive).

Optionally, selecting the representative hash values uses a determinative process. As the representative hash values are selected consistently, a reliable check can be made for each data item by comparison to the sparse index.

Optionally, the determinative process comprises selecting the one or more largest hash values. Optionally, two representative hash values are selected. Optionally, compiling the sparse index includes calculating a weak hash for each representative hash value. By this way, the sparse index can be generated to be more lightweight and more efficient. Further, it is easier to store the sparse index in a fast-access memory.

Optionally, compiling the sparse index includes compressing each pointer by compressing a file path for the list. Optionally, compressing each pointer includes storing a hash value of a file path for the list, an indication of the corresponding large block location within the data item, and a file size indication for the data item, wherein a length of the hash value of the file path is based on the file size of the data item. By this way, the size of the sparse index may be further reduced, which allows the spare index to be extremely lightweight and efficient. Further, this can make it easier to store the entire sparse index in the fast access memory.

Optionally, the sparse index is stored in a memory, and the lists of strong hash values stored in a disk storage. The sparse index may be accessed quickly and avoids a costly disk access operation for validation, for example, a duplicate data item. Optionally, each strong hash has about 20 bytes.

Optionally, the method includes a data item lookup by (i) receiving a query list of strong hash values corresponding to an incoming data item, (ii) checking the query list of strong hash values against the sparse index for matches, and (iii) retrieving the list of strong hash values and checking for a match against the incoming data item for one or more positive matches.

By this way, the incoming data item with a write operation on the data storage system may be queried, without accessing the data storage system itself. If the incoming data item exists on the data storage system, then the incoming data item gets rejected to avoid the duplication of data in the data storage system, and to reduce unnecessary disc time and network traffic. If the data storage system supports an xcopy function, xcopy can be used to reference the duplicate data from a new location, thereby providing online deduplication. This online deduplication function requires only one IO to access and update the metadata, once the duplicate incoming data item is identified. This can improve the performance of the data storage system by reducing disk access. The method also reduces network traffic as the actual data need not be transferred to the data storage system over a network.

Optionally, receiving the query list of strong hash values corresponding to the incoming data item includes, (i) dividing the incoming data item into one or more large query blocks, (ii) dividing each large query block into a plurality of small query blocks, and (iii) calculating a strong hash value for each of the small query blocks and generating the query list of strong hash values by selecting one or more representative query hash values for the large query block. The query is reduced to a comparison between the representative query hash values and the representative hash values in the sparse index, thereby making the process more efficient.

Optionally, the method further includes, in response to a match against the incoming data item in the list of strong hash values, (i) determining a location of the matching large block corresponding to the list of strong hash values, and (ii) writing, at an intended location for the incoming data item, a reference to the location of the matching large block. If the incoming data item exists on the data storage system, the method references the duplicate data from a new location, thereby providing online deduplication. This improves the performance of the data storage system by reducing disk access. The method also reduces the network traffic as the transfer of actual data can be rejected to avoid the duplication of data in the data storage system, and to reduce unnecessary disc time and network traffic.

Optionally, the method further includes generating a log recording one or more changes made to the data storage system over a defined period of time. The method further includes, after the predefined period of time, (i) identifying one or more large blocks that have been changed, (ii) updating the list of strong hash values for each of the changed large blocks, (iii) selecting new representative hash values for each of the changed large blocks, and (iv) recompiling the sparse index based on the new representative hash values.

According to a second aspect, there is provided a computer-readable medium configured to store instructions which, when executed by a processor, cause the processor to execute the above method.

According to a third aspect, there is provided a data indexing module for a data storage system, the module comprising one or more processors configured to execute the method.

According to a fourth aspect, there is provided a data storage system that includes one or more data storage units, and the above data indexing module.

The data indexing module provides the list of strong hashes including a record of the strong hashes which have been selected as representative hash values and included in the sparse index. Based on this additional metadata (i.e. the strong hashes and the representative hash values), the data indexing module can detect data similarities. The data indexing module provides online deduplication that improves the performance of the data storage system by reducing disk access time/operations. The data indexing module further reduces the network traffic as the transfer of actual data may be rejected to avoid the duplication of data in the data storage system.

A technical problem in the prior art is resolved, where the technical problem concerns efficient storage, scalable deduplication removal, and a compact scalable layered indexing of the data item in the high-performance media such as random-access memory (RAM).

Therefore, in contradistinction to the prior art, according to the computer-implemented method for indexing the data item in the data storage system, the data indexing module and the data storage system for indexing the data item in the data storage system, the performance of the data storage system is improved, by deduplicating the data item without changing underlying data. The data indexing module also provides the list of strong hashes including a record of the strong hashes which have been selected as representative hash values and included in the sparse index. Based on this additional metadata (i.e. the strong hashes and the representative hash values), the data storage system can detect data similarities. The data indexing module provides online deduplication that improves the performance of the data storage system by reducing disk access time/operations. The data indexing module further reduces the network traffic as the transfer of actual data may be rejected to avoid the duplication of data in the data storage system.

These and other aspects of the disclosure will be apparent from and the implementation(s) described below.

BRIEF DESCRIPTION OF DRAWINGS

Implementations of the disclosure will now be described, by way of example only, with reference to the accompanying drawings, in which.

DETAILED DESCRIPTION OF THE DRAWINGS

Implementations of the disclosure provide a computer-implemented method for indexing a data item in a data storage system, a data indexing module for the data storage system, and the data storage system including one or more data storage units, and the data indexing module for indexing the data item.

To make solutions of the disclosure more comprehensible for a person skilled in the art, the following implementations of the disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
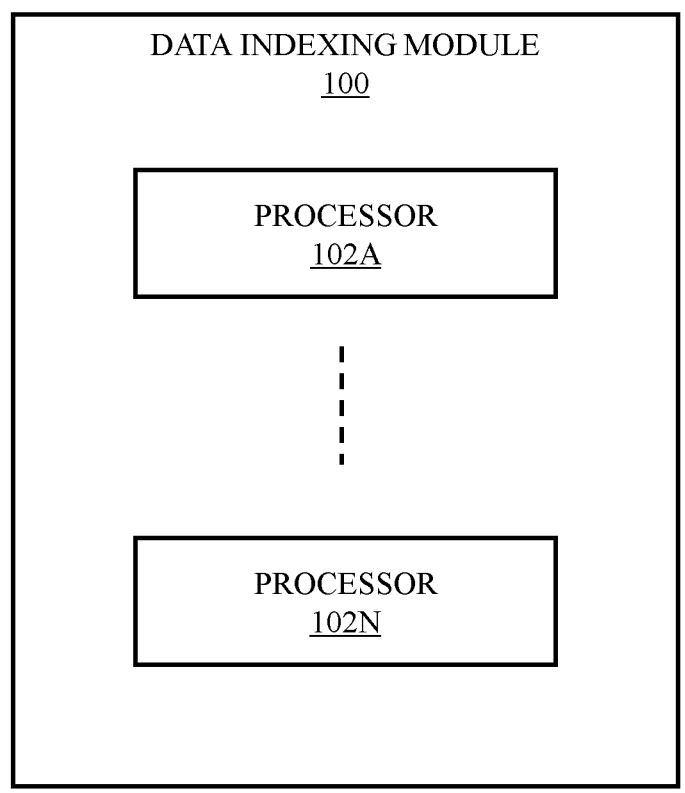
FIG. 1 is a block diagram of a data indexing module for a data storage system in accordance with an implementation of the disclosure.

FIG. 1 is a block diagram of a data indexing module 100 for a data storage system in accordance with an implementation of the disclosure. The data indexing module 100 includes one or more processors 102A-N. The one or more processors 102A-N are configured to execute a method for indexing a data item in the data storage system. The one or more processors 102A-N are configured to divide the data item into one or more large blocks. The one or more processors 102A-N are configured to divide each large block into one or more small blocks. The one or more processors 102A-N are configured to calculate a strong hash value for each of the small blocks and store a list of strong hash values with a pointer to a location of the large block. The one or more processors 102A-N are configured to, from the list of strong hash values calculated for each large block, select one or more representative hash values for the large block. The one or more processors 102A-N are configured to compile a sparse index including an entry for each large block. Each entry is based on the representative hash values and a pointer to the list of strong hash values for each large block.

The data indexing module 100 provides the list of strong hashes including a record of the strong hashes which have been selected as representative hash values and included in the sparse index. Based on this additional metadata (i.e. the strong hashes and the representative hash values), the data indexing module 100 can detect data similarities. The data indexing module 100 provides online deduplication that improves the performance of the data storage system by reducing disk access time/operations. The data indexing module 100 further reduces the network traffic as the transfer of actual data may be rejected to avoid the duplication of data in the data storage system.

Optionally, the one or more processors 102A-N select the representative hash values using a determinative process. As the representative hash values are selected consistently, a reliable check can be made for each data item by comparison to the sparse index. The determinative process may include selecting one or more largest hash values. Optionally, two representative hash values are selected. Optionally, the one or more processors 102A-N compile the sparse index by calculating a weak hash for each representative hash value. By this way, the sparse index can be generated to be more lightweight and more efficient. Further, it is easier to store the sparse index in a fast-access memory.

Optionally, the one or more processors 102A-N compile the sparse index by compressing each pointer by compressing a file path for the list. Optionally, the one or more processors 102A-N compress each pointer by storing a hash value of a file path for the list, an indication of the corresponding large block location within the data item, and a file size indication for the data item. A length of the hash value of the file path is based on the file size of the data item. By this way, the size of the sparse index may be further reduced, which allows the spare index to be extremely lightweight and efficient. Further, this can make it easier to store the entire sparse index in the fast access memory.

The sparse index may be stored in a memory, and the lists of strong hash values may be stored in a disk storage. The sparse index may be accessed quickly and avoids a costly disk access operation for validation, for example, a duplicate data item. Optionally, each strong hash has about 20 bytes.

Optionally, the one or more processors 102A-N are configured to include a data item lookup by: (i) receiving a query list of strong hash values corresponding to an incoming data item, (ii) checking the query list of strong hash values against the sparse index for matches, and (iii) retrieving the list of strong hash values and check for a match against the incoming data item for one or more positive matches.

By this way, the incoming data item with a write operation on the data storage system may be queried, without accessing the data storage system itself. If the incoming data item exists on the data storage system, then the incoming data item gets rejected to avoid the duplication of data in the data storage system, and to reduce unnecessary disc time and network traffic. If the data storage system supports an xcopy function, xcopy can be used to reference the duplicate data from a new location, thereby providing online deduplication. This online deduplication function requires only one IO to access and update the metadata, once the duplicate incoming data item is identified. This can improve the performance of the data storage system by reducing disk access. The data indexing module 100 also reduces network traffic as the actual data need not be transferred to the data storage system over a network.

Optionally, the one or more processors 102A-N are configured to receive the query list of strong hash values corresponding to the incoming data item by: (i) dividing the incoming data item into one or more large query blocks, (ii) dividing each large query block into a plurality of small query blocks, and (iii) calculating a strong hash value for each of the small query blocks and generating the query list of strong hash values by selecting one or more representative query hash values for the large query block. The query is reduced to a comparison between representative query hash values and representative hash values in the sparse index, thereby making the process more efficient.

Optionally, the one or more processors 102A-N are configured to, in response to a match against the incoming data item in the list of strong hash values, (i) determine a location of the matching large block corresponding to the list of strong hash values, and (ii) write, at an intended location for the incoming data item, a reference to the location of the matching large block. If the incoming data item exists on the data storage system, the one or more processors 102A-N references the duplicate data from a new location, thereby providing online deduplication. This improves the performance of the data storage system by reducing disk access. The one or more processors 102A-N also reduces the network traffic as the transfer of actual data can be rejected to avoid the duplication of data in the data storage system, and to reduce unnecessary disc time and network traffic.

Optionally, the one or more processors 102A-N are configured to generate a log recording one or more changes made to the data storage system over a defined period of time. Optionally, the one or more processors 102A-N are configured to, after the predefined period of time, (i) identify one or more large blocks that have been changed, (ii) update the list of strong hash values for each of the changed large blocks, (iii) select new representative hash values for each of the changed large blocks, (iv) recompile the sparse index based on the new representative hash values.

Figure 2:
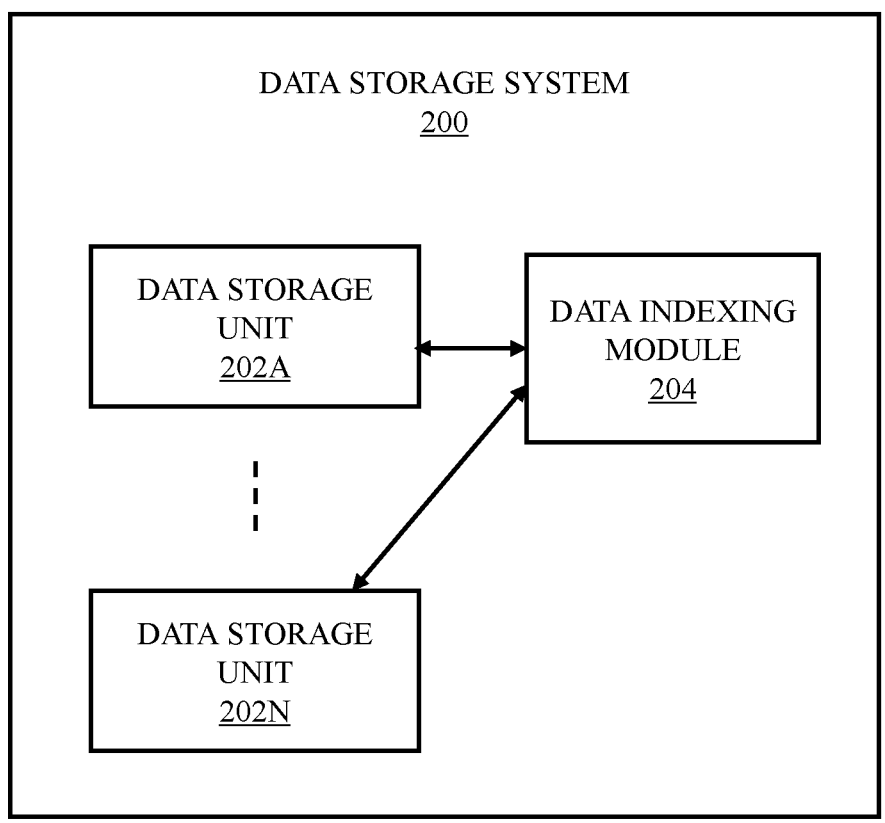
FIG. 2 is a block diagram of a data storage system in accordance with an implementation of the disclosure.

FIG. 2 is a block diagram of a data storage system 200 in accordance with an implementation of the disclosure. The data storage system 200 includes one or more data storage units 202A-N and a data indexing module 204. Optionally, the one or more data storage units 202A-N are communicatively connected to the data indexing module 204. The data indexing module 204 is configured to divide a data item into one or more large blocks. The data indexing module 204 is configured to divide each large block into one or more small blocks. The data indexing module 204 is configured to calculate a strong hash value for each of the small blocks and store a list of strong hash values with a pointer to a location of the large block. The data indexing module 204 is configured to, from the list of strong hash values calculated for each large block, select one or more representative hash values for the large block. The data indexing module 204 is configured to compile a sparse index including an entry for each large block. Each entry is based on the representative hash values and a pointer to the list of strong hash values for each large block.

The data storage system 200 provides the list of strong hashes including a record of the strong hashes which have been selected as representative hash values and included in the sparse index. Based on this additional metadata (i.e. the strong hashes and the representative hash values), the data storage system 200 can detect data similarities. The data storage system 200 provides online deduplication that improves the performance of the data storage system 200 by reducing disk access time/operations. The data storage system 200 further reduces the network traffic as the transfer of actual data may be rejected to avoid the duplication of data in the data storage system 200.

The data storage system 200 is a term referred to describe a data storage unit 202, or a group of data storage units 202A-N, that a network uses store copies of one or more data items across high-speed connections. The one or more data storage units 202A-N are essential because it backs up critical data items/files and other data to a central location. The data storage system 200 enables users to easily access these data items/files. The one or more data storage units 202A-N are storage devices that are connected to a network that allows storage and retrieval of data from a central location for authorized network users.

Figure 3A:
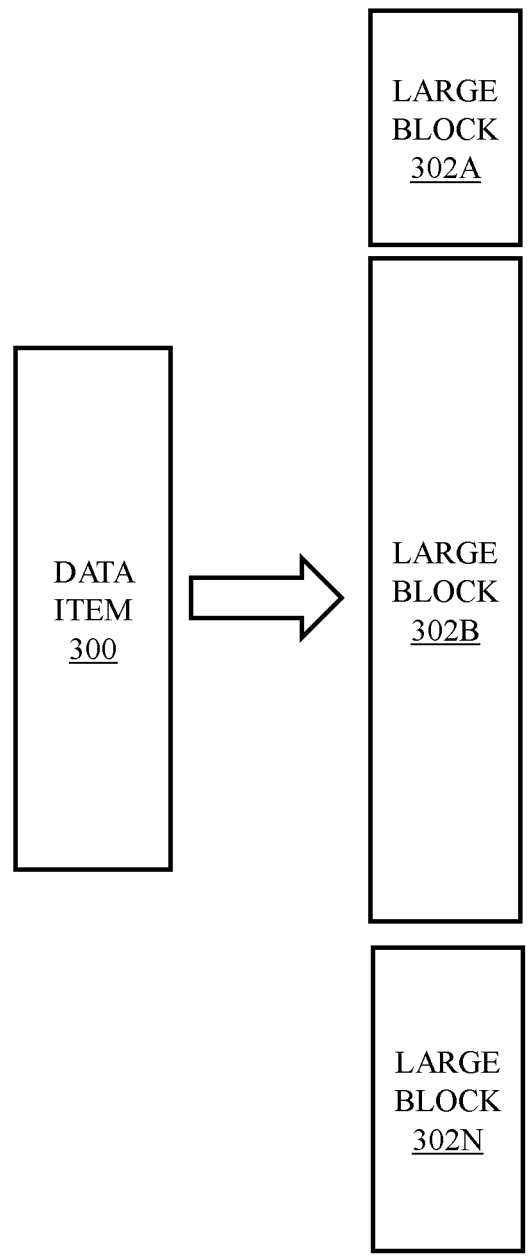
FIG. 3A is an exemplary method of dividing a data item into one or more large blocks using a data indexing module in accordance with an implementation of the disclosure.

FIG. 3A is an exemplary method of dividing a data item 300 into one or more large blocks 302A-N using a data indexing module in accordance with an implementation of the disclosure. The data indexing module includes one or more processors. The one or more processors are configured to divide the data item 300 into the one or more large blocks 302A-N. Optionally, all incoming data item is handled according to context groups, for example, same volume offset, same file offset, time locality, etc. The one or more processors divide the data item 300 into the one or more large blocks 302A-N using a rolling hash algorithm to detect semantic anchors for segmentation, or fixed sized segments.

Figure 3B:
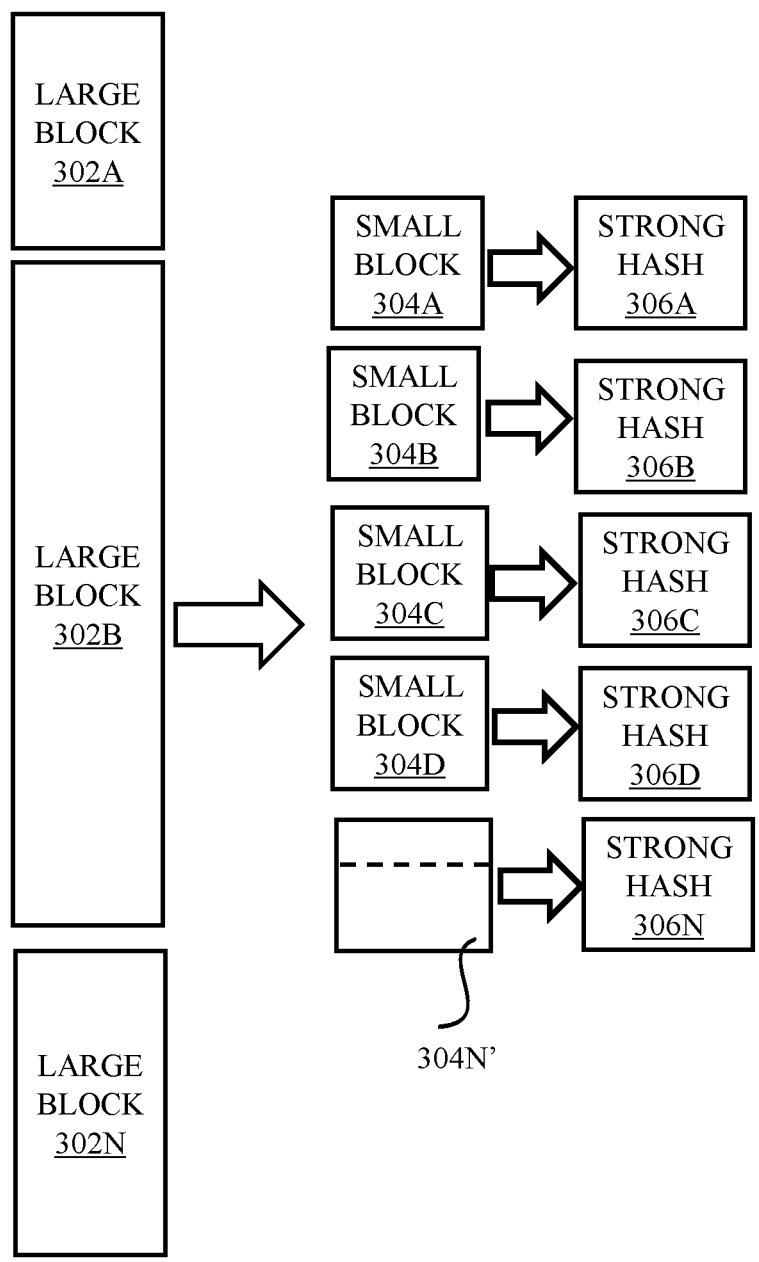
FIG. 3B is an exemplary method of dividing each large block into one or more small blocks and calculating strong hash values for each of the one or more small blocks in accordance with an implementation of the disclosure.

With reference to FIG. 3A, FIG. 3B is an exemplary method of dividing each large block 302A-N into one or more small blocks 304A-N and calculating strong hash values 306A-N for each of the one or more small blocks 304A-N in accordance with an implementation of the disclosure. The one or more processors are configured to divide each large block 302A-N into the one or more small blocks 304A-N. Optionally, if a re-segmentation is applied into the one or more small blocks 304A-N, a last fixed size small block may not have enough data to fill entire fixed size. In that case, padding may be applied to fill a remaining size. The padding can be done by inserting a predetermine compassable pattern into the remaining space of the fixed size small block. The one or more processors are configured to calculate the strong hash values 306A-N for each of the small blocks 304A-N and stores a list of strong hash values with a pointer to a location of each large block. Optionally, the one or more processors calculates a strong hash value for each of the small blocks 304A-N using a cryptographic hash algorithm. Optionally, 'weak hashes' may be used to access a first layer of an index.

Figure 3C:
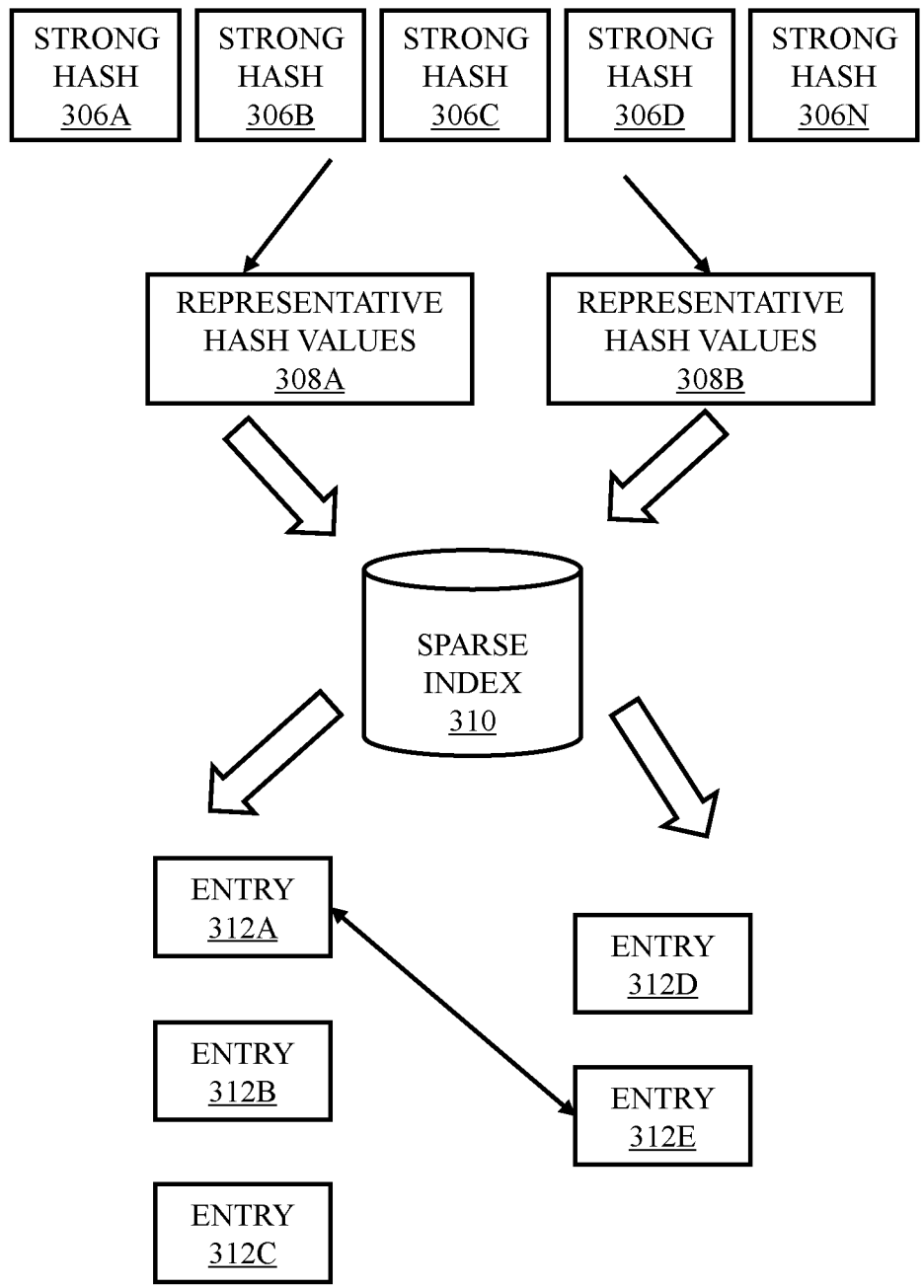
FIG. 3C is an exemplary method of selecting one or more representative hash values and compiling a sparse index in accordance with an implementation of the disclosure.
Figure 3D:
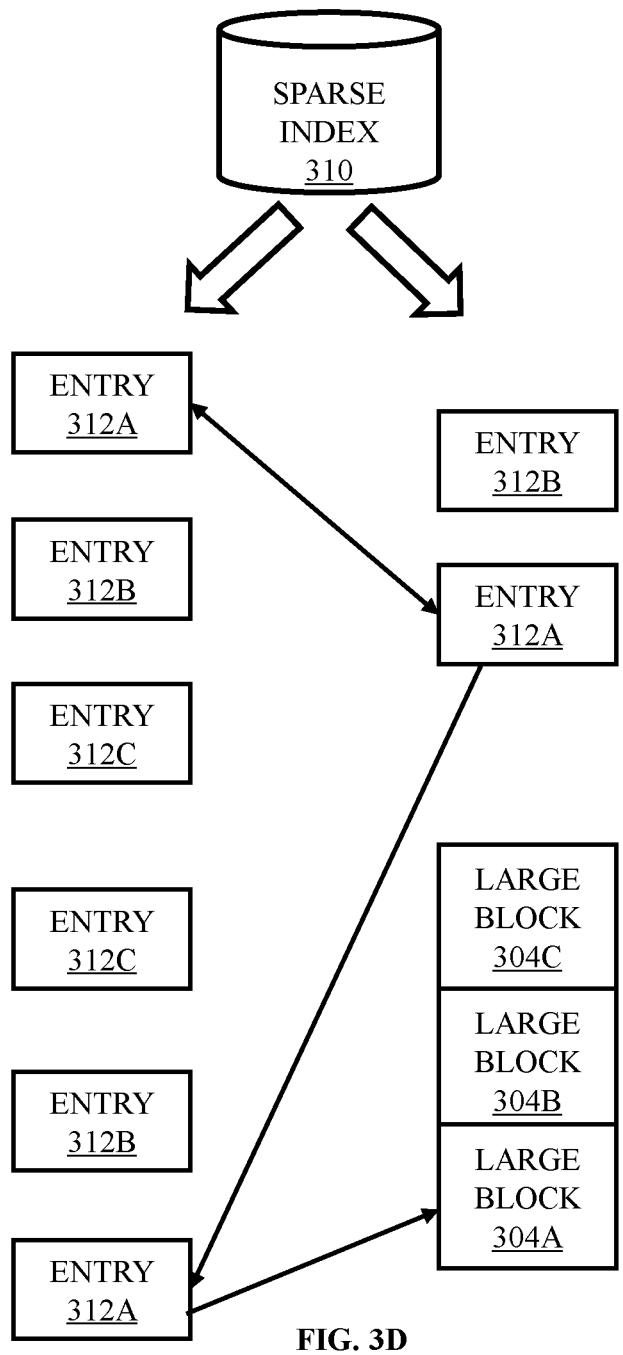
FIG. 3D is an exemplary view that illustrates an entry for each large block in accordance with an implementation of the disclosure.

With reference to FIG. 3A and FIG. 3B, FIG. 3C is an exemplary method of selecting one or more representative hash values 308A-B and compiling a sparse index 310 in accordance with an implementation of the disclosure. The one or more processors are configured to select the one or more representative hash values 308A-B for a large block from the list of strong hash values 306A-N calculated for each large block 302A-N. Optionally, the one or more processors select the one or more representative hash values 308A-B uses a determinative process. The determinative process may include selecting the one or more largest hash values. Optionally, two representative hash values are selected. The one or more processors are configured to compile the sparse index 310 including an entry for each large block. Each entry (e.g. 312A-E) is based on the one or more representative hash values 308A-B and a pointer to the list of strong hash values for each large block. Optionally, the one or more processors compiles the sparse index 310 by calculating a weak hash for each representative hash value 308A-B.

With reference to FIG. 3A, FIG. 3B, and FIG. 3C, FIG. 3D is an exemplary view that illustrates an entry for each large block in accordance with an implementation of the disclosure. The sparse index 310 includes an entry 312A for each large block. Each entry 312A is based on representative hash values and a pointer to a list of strong hash values for each large block. Two sets of corresponding entries for the incoming data item may be retrieved from the sparse index 310 by a data indexing module. The two sets of corresponding entries may be referred to as sparse index sets. A set of entries (e.g. 312A-C) that are appearing in both the sparse index sets is created separately which may be referred to as a matching set. If the matching set is not empty, then the set is referred to as a relevant set. If the matching set is empty, then a union between the two sparse index sets is referred to as a relevant set. If the relevant set holds entries with a matching context id, for example, file id, then the entries are referred to as relevant entries. Optionally, all the entries are regarded as the relevant entries. From the relevant entries, the data indexing module sets an entry by choosing a closest offset.

To match with the incoming data item, the one or more representative hash values from the list of strong hash values are selected from the sparse index 310. Optionally, two representative hash values are selected. The two representative hash values are used to reach relevant metadata of the incoming data item and data that correspond to relevant context, for example, file, volume, etc. The metadata for each representative hash value may be arranged in separate files in a strong hash repository. The one or more representative hash values are pointers to an actual location of the large block on one or more data storage units that are included in the sparse index 310. The sparse index 310 is compiled by calculating a weak hash for each representative hash value.

The data indexing module is supported with an xcopy function to reference the duplicate data from a new location, providing online deduplication. The online deduplication function requires only one input-output IO to access and update metadata, once the duplicate incoming data item is identified. Thereby, the performance of a data storage system is improved by reducing disk access. Hence, network traffic is also reduced, and the actual data need not be transferred.

Optionally, each pointer is compressed by storing a hash value of a file path for the list, an indication of the corresponding large block location within the data item, and a file size indication for the data item, A length of the hash value of the file path is based on the file size of the data item.

During storing the hash value, a combined value of the file path representation and the offset in the file for the list is represented by a 64-bit value. The 64-bit value is divided as follows: 2 bits of the 64-bit value indicate a range of file sizes. The file sizes may be from one of the following by assuming 4 megabytes (MB) for association block sizes and 32 Peta Bytes (PB) for a repository storage. The file sizes may be from 1 Megabyte MB to 1 gigabyte, GB, and rest of bits are parsed as: (a) 10 bits that represent a specific association block in a file of at most 1 GB (that is 1 GB/1 MB=1024 entries), and (b) 52 bits (rest of the bits) that identify a specific strong hashes file. The file sizes may be from 1 GB to 1 terabyte, TB. The rest of the bits are parsed as: (a) 20 bits that represent the specific association block in a file of at most 1 TB (that is 1 TB/1 MB entries), and (b) 42 bits (rest of the bits) that identify the specific strong hashes file. The file sizes may be from 1 TB to 1 Peta Bytes, PB, and the rest of bits are also parsed as: (a) 32 bits that represent the specific association block in the file of at most 1 PB (that is 1 PB/1 MB entries), and (b) 32 bits (rest of the bits) that identify the specific strong hashes file.

The compression of each pointer enables a compact direct pointer to a file and an offset value while guarantying a small number of collisions between hash path representations as following. For 1M-1 GB file sizes, the data storage system is fully populated with the 1M-1 GB file sizes that have at most $2^{35}$ files (32 MB/1 MB). In such a category of file sizes, 52 bits are used for each file path identification, thereby producing a range of $2^{52}$ possible values. Optionally, a number of collisions is $(2^{35})^2/2^{52}=2^{18}$. Optionally, a chance to encounter the collision is $2^{18}/2^{35}=\frac{1}{2}^{35}$. For 1M-1 GB file sizes, the data storage system is fully populated with the 1M-1 GB file sizes that have at most $2^{25}$ files (32 MB/1 GB). In such a category of file size, 42 bits are used for each file path identification, thereby producing a range of $2^{42}$ values. Optionally, the number of collisions is $(2^{25})^2/2^{42}=2^8$. Optionally, the chance to encounter the collision may be $2^8/2^{25}=\frac{1}{2}^{17}$. For 1 TB-1 PB file sizes, the data storage system is fully populated with the 1 TB-1 PB file sizes have at most $2^{15}$ (32 PB/1 TB) files. In such a category of the file size, 32 bits are used for each file path identification, thereby produce a range of $2^{32}$ possible values. The number of collisions may be $(2^{15})^2/2^{32}$ which is equal to $2^{-2}$ and the chance to encounter the collision may be $2^{-2}/2^{15}=\frac{1}{2}^{17}$. There may a range of $2^{15}$ values.

Optionally, the sparse index 310 is stored in a memory, and the lists of strong hash values are stored in a disk storage. Each strong hash has about 20 bytes. The size of the sparse index 310 may be further reduced, and the spare index becomes extremely lightweight and more efficient. Thereby, it is easier to store the entire sparse index 310 in a fast-access memory.

Optionally, information for each representative hash value may be divided into one for a non-aggregated context, or more for an aggregated context, context blocks. The metadata for each representative hash value includes relevant weak hashes that lead to that block, a data file id, a data file offset, a number of referenced chunks, a list of chunks. Each chunk includes a chunk size (in case each strong hash is used for variable-size chunks), and a strong hash.

Optionally, a compact matching of the incoming data item with relevant data using metadata enables the creation of an efficient index layer that requires 16 GB per 1 TB of data to cover. The compact matching enables implementations in which the index layer is kept in very fast storage, as random-access memory (RAM).

Optionally, a combination between the sparse index 310 and the metadata repository enables an efficient access to metadata and data information since the data and the metadata are grouped according to storage location and context. Optionally, the combination between the sparse index 310 and the metadata repository enables the data storage system to anticipate expected data and metadata by context, perform read ahead of both, efficiently utilize storage read and write caches, and minimize expensive storage physical lookup, as cylinder change in spinning disks.

Figure 4:
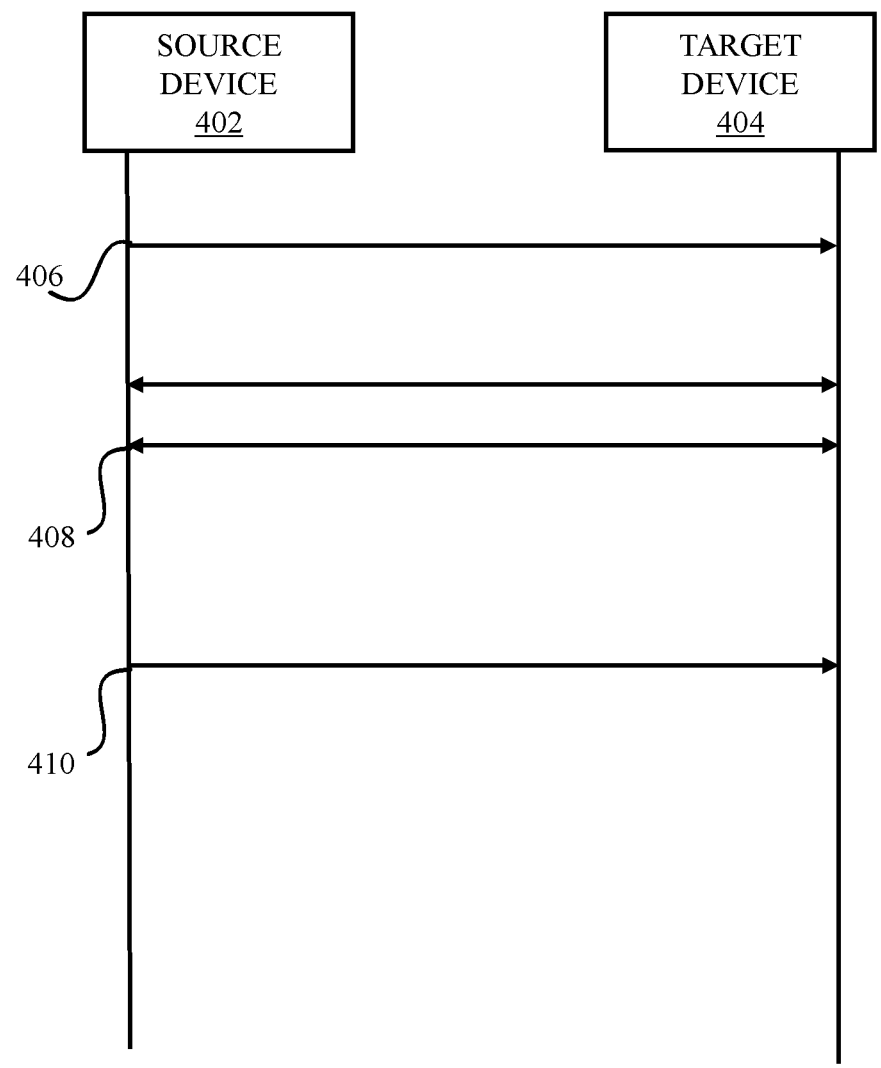
FIG. 4 is an exemplary interaction diagram that illustrates a method of transferring data from a source device to a target device by sending a flow initialization message in accordance with an implementation of the disclosure.

FIG. 4 is an exemplary interaction diagram that illustrates a method of transferring data from a source device 402 to a target device 404 by sending a flow initialization message in accordance with an implementation of the disclosure. At a step 406, the flow initialization message is sent to the target device 404 by the source device 402 before starting a backup of a large file or a directory including small files/data items. The source device 402 may be a user device or a client device and the target device 404 may be a server. The source device 402 sends the flow initialization message to the target device 404 to link a flow identifier to a specific data item, file, or a directory path. Optionally, the flow identifier is unique to each source device 402 (e.g. a client device) and is not shared between sources. At a step 408, data is transferred from the source device 402 to the target device 404. At a step 410, once the data transfer has ended, a flow termination message is sent to the target device 404 by the source device 402 to enable the target device 404 to clear allocated resources that are attached to this flow. The source device 402 sends the flow termination message to the target device 404 in order to explicitly release the flow identifier. A new flow initialization message with an already used flow identifier may be also considered as the flow termination message.

Figure 5:
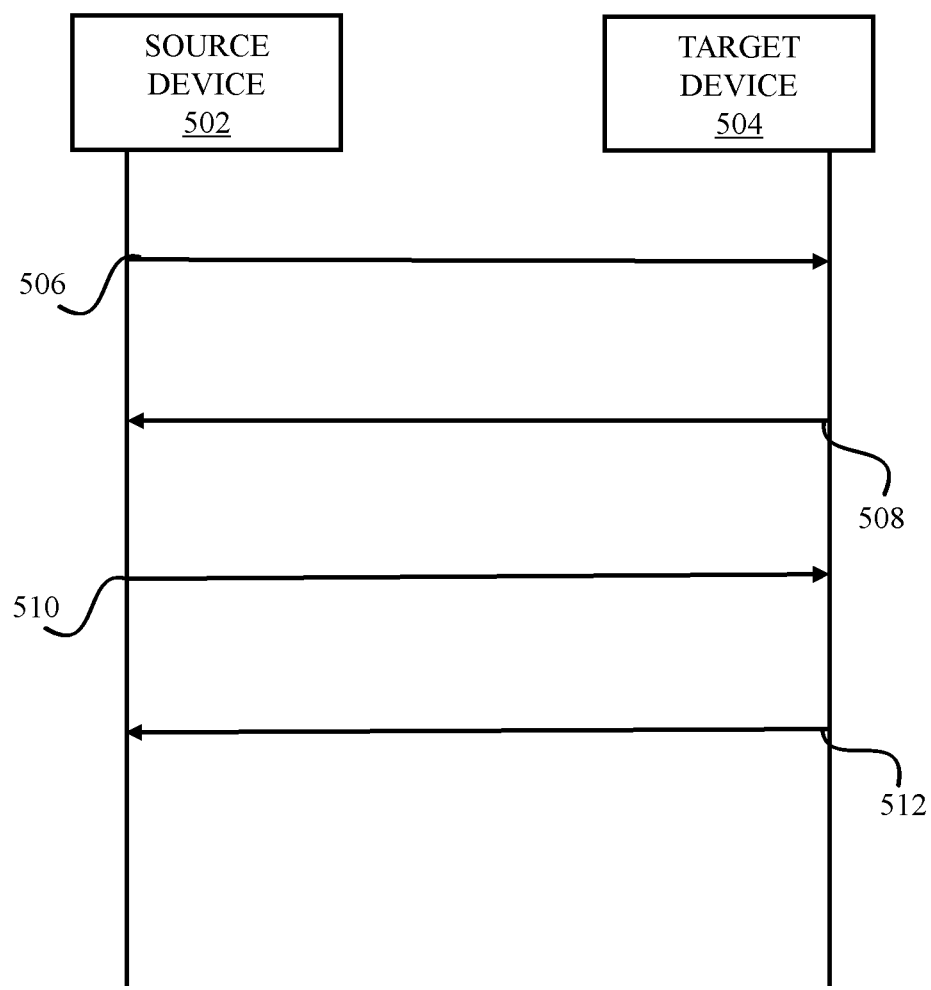
FIG. 5 is an exemplary interaction diagram that illustrates a method of transferring data from a source device to a target device by sending a strong hash set message in accordance with an implementation of the disclosure.

FIG. 5 is an exemplary interaction diagram that illustrates a method of transferring data from a source device 502 to a target device 504 by sending a strong hash set message in accordance with an implementation of the disclosure. At a step 506, a strong hash set message is sent from the source device 502 to the target device 504 if the source device 502 wants to transmit new data to the target device 504. The strong hash set message includes a set of strong hashes that represent data that is needed to be written. At a step 508, an acknowledgement message is sent from the target device 504 to the source device 502. The target device 504 specifies which data the target device 504 has and which data is missing in the acknowledgement message. In case, the target device 504 needs data completions, the source device 502 may issue one or more dataset messages to the target device 504 including compressed data. At a step 510, a raw dataset message is sent from the source device 502 to the target device 504. The raw dataset message includes raw compressed data that needs to be written to the target device 504. The raw dataset message may be used as a response to a partial acknowledgement of strong hashes sets. At a step 512, a raw data acknowledgment is sent from the target device 504 to the source device 502 as a response to a specific strong hash set or the raw dataset message.

Figure 6A:
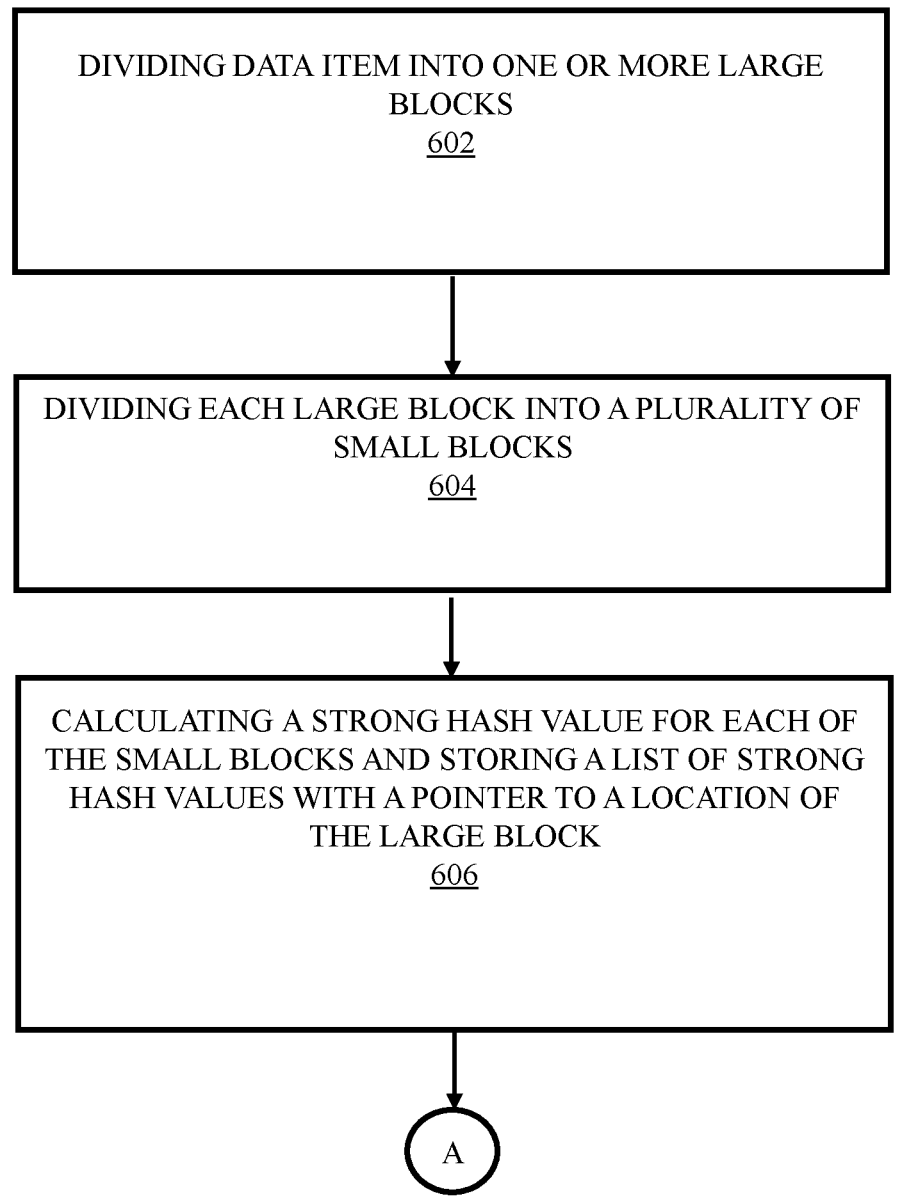
FIGS. 6A-6B are flow diagrams that illustrate a method for indexing a data item in a data storage system in accordance with an implementation of the disclosure.
Figure 6B:
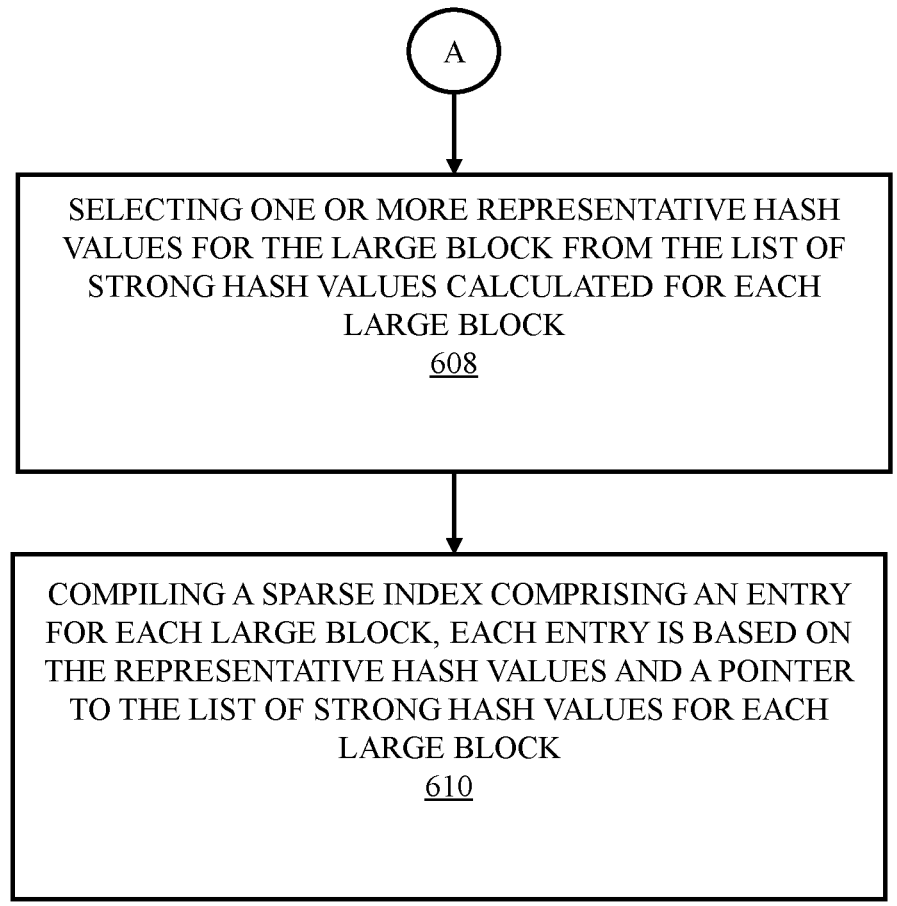

FIGS. 6A-6B are flow diagrams that illustrate a method for indexing a data item in a data storage system in accordance with an implementation of the disclosure. At a step 602, the data item is divided into one or more large blocks. At a step 604, each large block is divided into one or more small blocks. At a step 606, a strong hash value for each of the small blocks is calculated and a list of strong hash values with a pointer is stored to a location of the large block. At a step 608, one or more representative hash values for the large block are selected from the list of strong hash values calculated for each large block. At a step 610, a sparse index including an entry for each large block is compiled. Each entry is based on the representative hash values and a pointer to the list of strong hash values for each large block.

The method generates the sparse index for the data storage system without changing underlying data. If the data storage system supports an xcopy function, the deduplication of the data item is applied without changing the data format of the underlying data. In addition, the deduplication can be applied while maintaining high system performance, because after checking the sparse index, the relevant metadata can be reached with a single input-output (IO) operation, thereby reducing disc access time/operations and network traffic (for a network drive).

Optionally, selecting the representative hash values uses a determinative process. As the representative hash values are selected consistently, a reliable check can be made for each data item by comparison to the sparse index. The determinative process may include selecting one or more largest hash values. Optionally, two representative hash values are selected. Optionally, compiling the sparse index includes calculating a weak hash for each representative hash value. By this way, the sparse index can be generated to be more lightweight and more efficient. Further, it is easier to store the sparse index in a fast-access memory.

Optionally, compiling the sparse index includes compressing each pointer by compressing a file path for the list. Optionally, compressing each pointer includes storing a hash value of a file path for the list, an indication of the corresponding large block location within the data item, and a file size indication for the data item. A length of the hash value of the file path is based on the file size of the data item. By this way, the size of the sparse index may be further reduced, which allows the spare index to be extremely lightweight and efficient. Further, this can make it easier to store the entire sparse index in a fast-access memory. The sparse index may be stored in a memory, and the lists of strong hash values may be stored in a disk storage. The sparse index may be accessed quickly and avoids a costly disk access operation for validation, for example, a duplicate data item. Optionally, each strong hash has about 20 bytes. Optionally, the method further including a data item lookup by (i) receiving a query list of strong hash values corresponding to an incoming data item, (ii) checking the query list of strong hash values against the sparse index for matches, and (iii) retrieving the list of strong hash values and checking for a match against the incoming data item for one or more positive matches.

By this way, the incoming data item with a write operation on the data storage system may be queried, without accessing the data storage system itself. If the incoming data item exists on the data storage system, then the incoming data item gets rejected to avoid the duplication of data in the data storage system, and to reduce unnecessary disc time and network traffic. If the data storage system supports an xcopy function, xcopy can be used to reference the duplicate data from a new location, thereby providing online deduplication. This online deduplication function requires only one IO to access and update the metadata, once the duplicate incoming data item is identified. This can improve the performance of the data storage system by reducing disk access. The method also reduces network traffic as the actual data need not be transferred to the data storage system over a network.

Optionally, receiving the query list of strong hash values corresponding to the incoming data item includes, (i) dividing the incoming data item into one or more large query blocks, (ii) dividing each large query block into a plurality of small query blocks, and (iii) calculating a strong hash value for each of the small query blocks and generating the query list of strong hash values by selecting one or more representative query hash values for the large query block. The query is reduced to a comparison between the representative query hash values and the representative hash values in the sparse index, thereby making the process more efficient.

Optionally, the method further includes, in response to a match against the incoming data item in the list of strong hash values, (i) determining a location of the matching large block corresponding to the list of strong hash values and (ii) writing, at an intended location for the incoming data item, a reference to the location of the matching large block. If the incoming data item exists on the data storage system, the method references the duplicate data from a new location, thereby providing online deduplication. This improves the performance of the data storage system by reducing disk access. The method also reduces the network traffic as the transfer of actual data can be rejected to avoid the duplication of data in the data storage system, and to reduce unnecessary disc time and network traffic.

Optionally, the method further includes generating a log recording one or more changes made to the data storage system over a defined period of time. Optionally, the method includes, after the predefined period of time, (i) identifying one or more large blocks that have been changed, (ii) updating the list of strong hash values for each of the changed large blocks, (iii) selecting new representative hash values for each of the changed large blocks, and (iv) recompiling the sparse index based on the new representative hash values.

In an implementation, a computer-readable medium is configured to store instructions which, when executed by a processor, causes the processor to execute the above method.

Optionally, the data storage system includes a metadata updating mechanism that is composed of a live data update repository, a data repository snapshot, or a log-based journal. The live data update repository may enable live random data updates which are not used as a reference for a duplication removal process. For example, in a file-based data storage system, a live mounted file system can be used as the 'live data update repository'.

The data repository snapshot may be used as a reference point for the duplication removal process. The data repository snapshot may be pointed by a metadata repository. The metadata repository may have an ability to point to one or more 'data repository snapshot' entities, and allow management of metadata for several generations of data. For example, in a file-based data storage system, a snapshot of the 'live data update repository' can be used as the 'data repository snapshot'.

The log-based Journal may be used to persistently record metadata delta between a latest 'live data update repository' and the 'data repository snapshot'. Optionally, all new incoming write requests are recorded on the 'live data update repository', for the data, and in the 'log-based journal', for the metadata.

Optionally, the data storage system automatically generates a new 'data repository snap' out of existing 'live data update repository' after a predefined period of time. At that point, the 'log-based journal' may be reviewed allowing an update of the metadata repository by all newly created metadata entries recorded in the 'log-based journal', thereby updating the hash values to point to new data that arrives at the data storage system.

In the case of supporting several generations of 'data repository snapshot', to reduce a scale of required updates to a sparse index database and a strong hash repository at each update iteration, a special pointing convention may be used. Optionally, a unique marker is used to point at the latest 'data repository snapshot', thereby enabling the data storage system to avoid a need to update all pointers for unchanged data. Optionally, if the data is overwritten and the hash values are required to point at an older generation of the data repository snapshot, a cyclic identification may be used to directly point on a specific data repository snapshot generation. The use of the cyclic IDing may enable to reduce the number of bits required to maintain the 'Data repository snapshot' generation ID.

Figure 7:
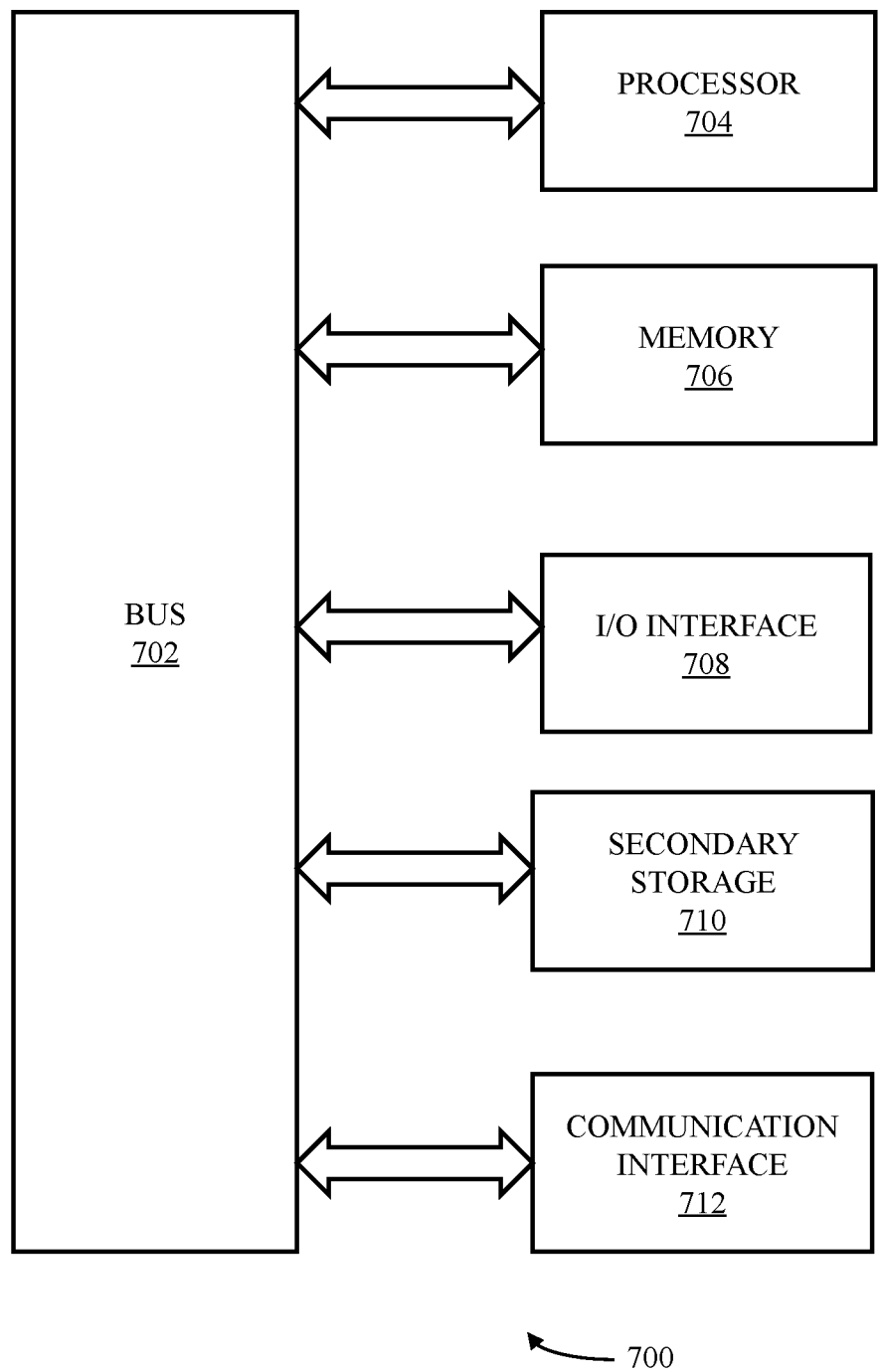
FIG. 7 is an illustration of a computing arrangement that is used in accordance with implementations of the disclosure.

FIG. 7 is an illustration of an exemplary computing arrangement 700 in which the various architectures and functionalities of the various previous implementations may be implemented. As shown, the computing arrangement 700 includes at least one processor 704 that is connected to a bus 702, wherein the computing arrangement 700 may be implemented using any suitable protocol, such as PCI (Peripheral Component Interconnect), PCI-Express, AGP (Accelerated Graphics Port), HyperTransport, or any other bus or point-to-point communication protocol (s). The computing arrangement 700 also includes a memory 706.

Control logic (software) and data are stored in the memory 706 which may take the form of random-access memory (RAM). In the present description, a single semiconductor platform may refer to a sole unitary semiconductor-based integrated circuit or chip. It should be noted that the term single semiconductor platform may also refer to multi-chip modules with increased connectivity which simulate on-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computing arrangement 700 may also include a secondary storage 710. The secondary storage 710 includes, for example, a hard disk drive and a removable storage drive, representing a floppy disk drive, a magnetic tape drive, a compact disk drive, digital versatile disk (DVD) drive, recording device, universal serial bus (USB) flash memory. The removable storage drive at least one of reads from and writes to a removable storage unit in a well-known manner.

Computer programs, or computer control logic algorithms, may be stored in at least one of the memory 706 and the secondary storage 710. Such computer programs, when executed, enable the computing arrangement 700 to perform various functions as described in the foregoing. The memory 706, the secondary storage 710, and any other storage are possible examples of computer-readable media.

In an implementation, the architectures and functionalities depicted in the various previous figures may be implemented in the context of the processor 704, a graphics processor coupled to a communication interface 712, an integrated circuit that is capable of at least a portion of the capabilities of both the processor 704 and a graphics processor, a chipset (i.e., a group of integrated circuits designed to work and sold as a unit for performing related functions, etc.).

Furthermore, the architectures and functionalities depicted in the various previous figures may be implemented in the context of a general computer system, a circuit board system, a game console system dedicated for entertainment purposes, an application-specific system. For example, the computing arrangement 700 may take the form of a desktop computer, a laptop computer, a server, a workstation, a game console, an embedded system.

Furthermore, the computing arrangement 700 may take the form of various other devices including, but not limited to a personal digital assistant (PDA) device, a mobile phone device, a smart phone, a television, etc. Additionally, the computing arrangement 700 may be coupled to a network (e.g., a telecommunications network, a local area network (LAN), a wireless network, a wide area network (WAN) such as the Internet, a peer-to-peer network, a cable network, or the like) for communication purposes through an I/O interface 708.

It should be understood that the arrangement of components illustrated in the figures described are exemplary and that other arrangement may be possible. It should also be understood that the various system components defined by the claims, described below, and illustrated in the various block diagrams represent components in some systems configured according to the subject matter disclosed herein. For example, one or more of these system components may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions, and alterations can be made herein without departing from the spirit and scope of the disclosure as defined by the appended claims.

What is claimed is:

1. A computer-implemented method for indexing a data item in a data storage system and handling metadata updates, the method comprising:
   dividing, by the data storage system, the data item into one or more large blocks;
   dividing, by the data storage system, each large block into a plurality of small blocks;
   calculating, by the data storage system, a strong hash value for each of the small blocks of a respective large block and storing a respective list of the strong hash values calculated for the respective large block with a pointer to a location of the respective large block;
   from the respective list of strong hash values calculated for the respective large block, selecting, by the data storage system, one or more representative strong hash values for the respective large block;
   compiling, by the data storage system, a sparse index of weak hashes by calculating, for each of the one or more representative strong hash values, a respective weak hash, wherein each respective weak hash corresponds to a respective strong hash value for a respective large block;
   storing, by the data storage system, the sparse index in a fast-access memory, wherein the fast-access memory comprises a random access memory (RAM), and wherein respective lists of strong hash values are stored in a disk storage, wherein the disk storage comprises a spinning disk storage or a solid-state drive (SSD);
   receiving, by the data storage system, a metadata update request;
   determining, by the data storage system, whether an incoming data item corresponding to the metadata update request already exists on the data storage system using the sparse index of weak hashes stored in the fast-access memory; and
   rejecting, by the data storage system, the incoming data item based on determining that the incoming data item already exists on the data storage system.

2. The computer-implemented method of claim 1, wherein selecting the one or more representative strong hash values uses a determinative process.

3. The computer-implemented method of claim 2, wherein the determinative process comprises selecting one or more largest hash values.

4. The computer-implemented method of claim 1, wherein two representative strong hash values are selected.

5. The computer-implemented method of claim 1, wherein compiling the sparse index further includes compressing a pointer to the respective list of strong hash values for the respective large block by compressing a file path for the respective list.

6. The computer-implemented method of claim 5, wherein compressing the pointer includes storing a hash value of the file path for the respective list, an indication of the corresponding large block location within the data item, and a file size indication for the data item, wherein a length of the hash value of the file path is based on the file size of the data item.

7. The computer-implemented method of claim 1, wherein each strong hash has about 20 bytes.

8. The computer-implemented method of claim 1, further comprising:
   performing a data item lookup including:
      obtaining a query list of strong hash values corresponding to an incoming data item;
      checking the query list of strong hash values against the sparse index for matches; and
      retrieving a list of strong hash values for a positive match and checking for a match against the incoming data item.

9. The computer-implemented method of claim 8, wherein receiving the query list of strong hash values corresponding to the incoming data item comprises:
   dividing the incoming data item into one or more large query blocks;
   dividing each large query block into a plurality of small query blocks; and
   calculating a strong hash value for each of the small query blocks and generating the query list of strong hash values by selecting one or more representative query hash values for the one or more large query blocks.

10. The computer-implemented method of claim 8, further comprising, in response to a match against the incoming data item:
    determining a location of a matching large block corresponding to the list of strong hash values retrieved for the positive match; and
    writing, at an intended location for the incoming data item, a reference to the location of the matching large block.

11. The computer-implemented method of claim 1, further comprising:
    generating a log recording one or more changes made to the data storage system over a defined period of time; and
    after the defined period of time:
        identifying one or more large blocks that have been changed;
        updating a list of strong hash values for each of the one or more changed large blocks;
        selecting new representative hash values for each of the one or more changed large blocks; and
        recompiling the sparse index based on the new representative hash values.

12. A non-transitory computer-readable medium having processor-executable instructions stored thereon for indexing a data item in a data storage system, wherein the processor-executable instructions, when executed, facilitate performance of the following:
    dividing the data item into one or more large blocks;
    dividing each large block into a plurality of small blocks;
    calculating a strong hash value for each of the small blocks of a respective large block and storing a respective list of the strong hash values calculated for the respective large block with a pointer to a location of the respective large block;
    from the respective list of strong hash values calculated for the respective large block, selecting one or more representative strong hash values for the respective large block;
    compiling a sparse index of weak hashes by calculating, for each of the one or more representative strong hash values, a respective weak hash, wherein each respective weak hash corresponds to a respective strong hash value for a respective large block;
    storing the sparse index in a fast-access memory, wherein the fast-access memory comprises a random access memory (RAM), and wherein respective lists of strong hash values are stored in a disk storage, wherein the disk storage comprises a spinning disk storage or a solid-state drive (SSD);
    receiving a metadata update request;
    determining whether an incoming data item corresponding to the metadata update request already exists on the data storage system using the sparse index of weak hashes stored in the fast-access memory; and
    rejecting the incoming data item based on determining that the incoming data item already exists on the data storage system.

13. A data storage system for indexing a data item, comprising:
    one or more memories having processor-executable instructions stored thereon; and
    one or more processors configured to execute the processor-executable instructions to facilitate performance of the following:
        dividing the data item into one or more large blocks;
        dividing each large block into a plurality of small blocks;
        calculating a strong hash value for each of the small blocks of a respective large block and storing a respective list of the strong hash values calculated for the respective large block with a pointer to a location of the respective large block;
        from the respective list of strong hash values calculated for the respective large block, selecting one or more representative strong hash values for the respective large block;
        compiling a sparse index of weak hashes by calculating, for each of the one or more representative strong hash values, a respective weak hash, wherein each respective weak hash corresponds to a respective strong hash value for a respective large block;
        storing the sparse index in a fast-access memory, wherein the fast-access memory comprises a random access memory (RAM), and wherein respective lists of strong hash values are stored in a disk storage, wherein the disk storage comprises a spinning disk storage or a solid-state drive (SSD);
        receiving a metadata update request;
        determining whether an incoming data item corresponding to the metadata update request already exists on the data storage system using the sparse index of weak hashes stored in the fast-access memory; and
        rejecting the incoming data item based on determining that the incoming data item already exists on the data storage system.

14. The non-transitory computer-readable medium of claim 12, wherein selecting the one or more representative strong hash values uses a determinative process.

15. The non-transitory computer-readable medium of claim 14, wherein the determinative process comprises selecting one or more largest hash values.

16. The non-transitory computer-readable medium of claim 12, wherein two representative strong hash values are selected.

17. The non-transitory computer-readable medium of claim 12, wherein compiling the sparse index further includes compressing a pointer to the respective list of strong hash values for the respective large block by compressing a file path for the respective list.

18. The non-transitory computer-readable medium of claim 17, wherein compressing the pointer includes storing a hash value of the file path for the respective list, an indication of the corresponding large block location within the data item, and a file size indication for the data item, wherein a length of the hash value of the file path is based on the file size of the data item.

19. The non-transitory computer-readable medium of claim 12, wherein the processor-executable instructions, when executed, further facilitate performance of the following:
    performing a data item lookup including:
        obtaining a query list of strong hash values corresponding to an incoming data item;
        checking the query list of strong hash values against the sparse index for matches; and
        retrieving a list of strong hash values for a positive match and checking for a match against the incoming data item.

20. The non-transitory computer-readable medium of claim 12, wherein the processor-executable instructions, when executed, further facilitate performance of the following:
    generating a log recording one or more changes made to the data storage system over a defined period of time; and
    after the defined period of time:
        identifying one or more large blocks that have been changed;
        updating a list of strong hash values for each of the one or more changed large blocks;
        selecting new representative hash values for each of the one or more changed large blocks; and recompiling the sparse index based on the new representative hash values.

\* \* \* \* \*